3,165,518
CATALYTIC CHLOROSULFONATION OF
QUINAZOLINONES
Herbert G. Arlt, Jr., Ridgefield, Conn., assignor to
American Cyanamid Company, Stamford, Conn., a corporation of Maine
No Drawing. Filed Aug. 3, 1962, Ser. No. 214,487
6 Claims. (Cl. 260—251)

This invention relates to an improved process for the chlorosulfonation of a 2-alkyl-7-halo-2,3-dihydro-4(1H)-quinazolinone with chlorosulfonic acid. More particularly, it is concerned with such chlorosulfonation in the presence of phosphorus pentachloride or thionyl chloride as an activator.

The chlorosulfonation with which the present invention is concerned may be represented in the following manner.

(A)
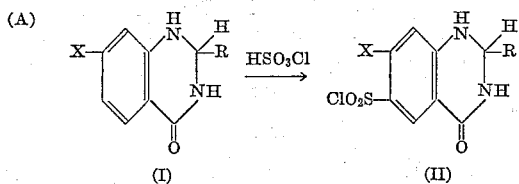

(I)  (II)

wherein R represents a lower alkyl group of from one to four carbon atoms and X represents a halogen, such as fluorine, chlorine or bromine. Quinazolinones of (I) are converted thereby to the 2-alkyl-7-halo-1,2,3,4-tetrahydro-4-oxo-6-quinazolinesulfonyl chlorides of (II).

This reaction is referred to below for simplicity as "reaction (A)" or simply as "(A)." Also to simplify reference thereto, the starting materials of reaction (A) are referred to below as "compounds (I)" or simply as "(I)"; the products as "compounds (II)" or "(II)."

Quinazolinones of Formula I may be prepared in a known manner by reacting the corresponding 4-halo-2-aminobenzamide with an aliphatic aldehyde in the presence of toluenesulfonic acid. The aldehyde used must contain one more carbon than does the desired 2-alkyl substituent. For example, when the aliphatic aldehyde is propionaldehyde, the product is 7-halo-2-ethyl-2,3-dihydro-4(1H)-quinazolinone.

Illustrative examples of quinazolinones of (I) which may be chlorosulfonated in accordance with the process of this invention include 7-chloro-2-methyl-2,3-dihydro-4(1H)-quinazolinone,
7-chloro-2-ethyl-2,3-dihydro-4(1H)-quinazolinone,
7-chloro-2-n-butyl-2,3-dihydro-4(1H)-quinazolinone,
7-bromo-2-methyl-2,3-dihydro-4(1H)-quinazolinone,
7-bromo-2-n-propyl-2,3-dihydro-4(1H)-quinazolinone,
7-fluoro-2-ethyl-2,3-dihydro-4(1H)-quinazolinone and the like.

Since the quinazolinone of (I) in which "R" is ethyl and "X" is chlorine is a typical starting material, herein, it will be taken as illustrative for purposes of discussion. For simplicity, it will be referred to below by the symbol "QEC." Similarly, the resultant corresponding chlorosulfonated quinazoline of (II) will be taken as illustrative and referred to below as "QECS." It is to be understood, however, that in the general discussion below these symbols are used for purposes of simplification only and the remarks are applicable also to the other compounds of the above-noted compounds of (I) and (II).

QECS, as an illustrative product of this invention, is readily converted to the known sulfonamide of the formula

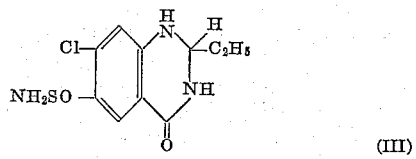

(III)

by treatment with ammonia. Other sulfonyl chlorides of (II), prepared according to the present invention, yield the corresponding sulfonamides of (III). The latter are known useful compounds, being shown for example in U.S. Patent No. 2,976,289 wherein they are produced by a different method.

It would appear from the foregoing discussion that a direct three-step synthesis from a 2-amino-4-halobenzamide to the desired corresponding sulfonamide should be available. Therein, reaction (A) would constitute the second step. Such a synthesis would be a valuable alternative to the more complex route shown for example in the above-noted patent.

Unfortunately, however, the alluring appearance of simplicity is deceptive. Reaction (A), as shown above, is found to be operative. Unfortunately, even when using the most painstaking care, yields of compounds (II) are too low. For that reason, the proposed three-step synthesis is not wholly satisfactory for commercial utilization. Nevertheless, if a procedure could be made available whereby (A) is not subject to this limitation, the overall synthesis still would be highly desirable. It is, therefore, a principal object of the present invention to provide an improved procedure for (A) whereby the yield can be increased sufficiently to make the three-step synthesis commercially feasible.

In general, this object has been accomplished to a surprisingly successful degree. In accordance with the present invention reaction (A) is carried out under controlled conditions in the presence of thionyl chloride or phosphorus pentachloride as an activator. Surprisingly, and without the excessive adverse side reactions which might be expected, yields of (II) are raised to a level at which the operation becomes economically feasible on a commercial scale. Yields of (II) are readily increased to some 150 to 250 percent of those previously obtainable.

However, as thus stated, the simplicity of the invention again is more apparent than real. Merely providing an activator of the present invention in the reaction medium will not produce the desired result. As will be amplified below, not only must the activator be provided, but several controls must first be established within limited ranges in setting up the reaction medium. Thereafter, the QEC, as illustrative of (I), must be added under controlled conditions and control must be maintained until reaction is substantially completed.

Among the various criteria which must be controlled, perhaps the most important are the ratio of QEC to chlorosulfonic acid, both initially and throughout the reaction; the ratio of QEC to activator; and the reaction temperature ranges, both initially and during the reaction.

As to the ratio of QEC to chlorosulfonic acid, for each one mol of QEC a total of between about three and about eight mols of chlorosulfonic acid must be provided. Preferably and in good practice this should be from about four to about six mols. As to the QEC:activator ratio;

for each one mol of QEC there should be present from about 0.75 to about four mols of the activator. Preferably and in good practice from about one to about two mols of phosphorus pentachloride or thionyl chloride will be used.

As to control of the temperature ranges, a typical reaction is carried out by combining into a reaction medium the correct amounts of chlorosulfonic acid and activator at an initial temperature between about 0° and about 25° C. If necessary, the latter may be increased, temperatures up to about 40° C. being usable but less satisfactory. Preferably, temperatures from about 10° to about 20° C. will be maintained. External cooling usually will be found necessary. A good agitation system should be started and maintained in operation throughout this and the subsequent steps. To the agitated medium, the QEC is slowly added. Resultant reaction is exothermic and external cooling ordinarily is necessary. The rate of QEC addition will depend on the size of the reaction mass and the efficiency of the cooling and agitating systems. It must be such that the reaction mass temperature is maintained at from about 10° to not over about 30° C., preferably ranging from about 15° to about 25° C.

Once the total amount of QEC has been added, agitation and temperature control should be continued until the reaction rate becomes too slow to be economically feasible. It is readily understood that this will depend on the particular installation being used. In general, some three to six hours will be found to constitute a good practice.

As will be seen from the foregoing description, each of these factors or controls may be varied within certain limits. However, each is critical. All must be maintained with the above-noted limits. If such precautions and controls are not maintained, the desired high conversion of QEC to QECS will not be obtained.

Once reaction has been carried to the desired degree, the product is recovered. In general, the mechanical steps in this recovery may be conventional and are not part of this invention. One convenient practice is to dilute the reaction mass by pouring it into a mixture of ice and water. QECS, or another corresponding compound (II), may be extracted with a suitable substantially water-immiscible solvent ester, such as isopropyl acetate or sec.-butyl acetate, in accordance with any desired mechanical procedure.

As noted above, a feature of QECS and other products of (II) is the ease with which their conversion to the corresponding sulfonamides of (III) can be accomplished by treatment with ammonia. When such conversion is desired, for example, the ammonia may be added directly to a QECS solution. The latter may be that obtained by the above-noted solvent ester extraction of the ice and water diluted reaction mass or dissolving the filter cake. In this way, procedure is simplified by avoiding purification between steps and purifying only the sulfonamide product. This conversion forms part of the subject matter of my copending joint application with G. T. Fitchett and F. X. Markley, Serial No. 214,537, filed August 3, 1962.

The procedure of the present invention will be further shown in conjunction with the following illustrative examples. Therein, unless otherwise noted, all parts and percentages are by weight and all temperatures are in degrees centigrade.

Due to their physical characteristics, direct recovery as such of compounds (II) is difficult. Accordingly, for purposes of simplification, in the following examples these products usually are assayed by conversion to the corresponding sulfonamide. This is done by ammonia addition to the organic solvent solution, as described immediately above and illustrated in some of the examples.

*Example 1*

To 42 parts (0.36 mol) of chlorosulfonic acid, there is added 18.8 parts (0.09 mol) of phosphorus pentachloride over a period of about 15 minutes while maintaining the temperature at 15° to 20° C. 19 parts (0.09 mol) of QEC is then added over a period of about 15 minutes while maintaining the temperature at 15° to 20° C., and the resultant reaction mass is agitated for an additional six hours at 20° to 25° C. Resultant slurry is poured into a mixture of ice and water while maintaining the temperature at from minus 5° to about 0° C. The aqueous mixture is extracted with about 150 parts of isopropyl acetate, followed by a second extraction with about 50 parts of isopropyl acetate and the extracts are combined. The QECS content corresponds to a QEC to QECS conversion of about 70 percent.

*Example 2*

64.3 parts (0.54 mol) of thionyl chloride is slowly added to 126 parts (1.08 mols) of chlorosulfonic acid while keeping the temperature below 20° C. 57.0 parts (0.27 mol) of QEC is added slowly over about one hour while maintaining the temperature at 15° to 25° C. by external cooling. The resulting reaction mixture is then stirred for three hours at 20° to 25° C. and then poured into a mixture of 200 parts of water, 75 parts of sodium chloride, 450 parts of secondary butyl acetate and 150 parts of acetone, keeping the temperature from 0° to 5° C. by internal cooling with the ice and external cooling with brine. The aqueous layer is allowed to settle and is drained off and reextracted with 150 parts of secondary butyl acetate. The QECS content of the combined extracts indicates a conversion QEC to QECS of about 55 percent.

*Example 3*

The procedure of Example 2 is repeated up to the point at which chlorosulfonation is completed. The reacted mass then is poured into about 250 parts of ice-water mixture containing 75 parts of salt. The pale-yellow, crystalline precipitate is collected by filtration, washed with cold water and as much of the water as possible is removed by vacuum filtration. The wet filter cake has a QECS content indicating a conversion of about 55 percent.

*Example 4*

To further illustrate the advantages of the present invention, the combined QECS-containing extracts from Example 1 are combined and at a temperature between about minus 10° and 0° C. are treated with gaseous ammonia until no further precipitation of reaction product is noted. The precipitate is dissolved by agitation and addition of about 100 parts of water and about 30 parts of 50% aqueous sodium hydroxide. After allowing the mass to separate into layers, the aqueous layer is separated from the organic layer, and the sulfonamide is precipitated from the aqueous layer by adding Dry Ice ($CO_2$) until the pH is approximately 8.5. The crude product (about 20 parts), is separated, washed and dried. It assays 78.4% real (a 60.1% yield). It melts at 235° to 237° C.

*Example 5*

A portion of product obtained in Example 4 is dissolved in water with the aid of sodium hydroxide and the solution is treated with activated carbon, diatomaceous earth and a small amount of sodium hydrosulfite. The product is reprecipitated by addition of hydrochloric acid to a pH of 4.5 to 5.0. The melting point of the purified product is 250.5° to 251° C. With a 96% recovery in the purification process, the overall yield of 7-chloro-2-ethyl-2,3-dihydro-4(1H)-quinazoline-6-sulfonamide, based on the quinazoline starting material, is 57.6% of theory.

*Example 6*

The procedure of Examples 1, 4 and 5 is repeated using about 200 parts of chlorosulfonic acid, about 100 parts of PCl₅ and about 60 parts of QEC. Yields of from about 58% to about 64.2% are obtained.

Example 7

The combined organic extracts obtained in Example 2 are cooled to minus 5° C. and anhydrous ammonia is introduced below the surface until no further evidence of reaction is noticeable. After removal of the excess ammonia, the reaction mixture is diluted with water to a total volume equal to that occupied by about 1,000 parts of water. The crude product is isolated by filtration, washed and dried. It amounted to about 38.5 parts (49.4% of theory). After further purification (by the procedure described in Example 5) the overall yield is 47.0% of theory.

Example 8

The wet filter cake obtained in Example 3 is dissolved in about 500 parts of acetone, and to the resultant solution is added about 200 parts of 28% aqueous ammonia. After standing for about 12 hours, the acetone is evaporated, leaving a slurry of the sulfonamide from which the crude product is collected by filtration. After purification by the procedure described in Example 5, the overall yield is about 47%.

Example 9

For purposes of comparison, and to further illustrate the invention, 21 parts of QEC mixed with about 4 parts of sodium chloride is reacted with 70 parts of chlorosulfonic acid as in Example 3 except that no activator is used. Conversion to QECS is about 30%. QECS is collected as in Example 4 and converted to the sulfonamide as in Example 8. Resultant sulfonamide is collected by distilling the acetone while replacing with an equal volume of water, followed by filtration of the precipitate. Resultant product after a purification treatment (according to Example 5) amounts to 7.5 parts, melting at 232° to 235° C. and having a purity of about 98%. This yield is only 26% of theory, based on the quinazolinone starting material.

Comparison of the results in Examples 4 to 9 clearly illustrates the advantages of the process of this invention. Losses during purification are substantially equal to about 4% in each case. After conversion to sulfonamide, the yield of product (M.P. 232° to 235°) in the absence of the activator in Example 9 is only 26% of theory. Using thionyl chloride as the activator, this is increased to 49.4% (at comparable purity) and 47% of purified product in Examples 7 and 8. Using phosphorus pentachloride, the yield of crude product (M.P. 235° to 237° C.) is raised to about 60% in Example 4 and of purified product (M.P. 250.5° to 251° C.) to from about 57.6% in Example 5 to about 64% in Example 6. This corresponds to yields of some 190% to 240% of that obtained without the use of an activator.

A unique feature of the present invention is the high specific activity of the thionyl chloride and phosphorus pentachloride in promoting the reaction without anticipated but undesirable side reactions. This is not true of other closely related chlorides of phosphorus or oxychlorides of sulfur. The following examples are illustrative of this fact.

Example 10

The procedure of Examples 2 and 7 is followed substituting an equimolecular amount of phosphorus trichloride for the thionyl chloride. The sulfonamide obtained is only 34.2% of theory, a yield within the order of magnitude obtained using chlorosulfonic acid without any activator.

Example 11

The procedure of Examples 2 and 7 is followed substituting an equimolecular amount of phosphorus oxychloride for the thionyl chloride. No sulfonamide is obtained.

Example 12

The procedure of Examples 2 and 7 is followed substituting an equimolecular amount of sulfuryl chloride for the thionyl chloride. The yield of sulfonamide amounts to only about 3.8% of theory.

In accordance with the procedure of this invention, the following sulfonyl chlorides are prepared:

2-methyl-7-chloro-1,2,3,4-tetrahydro-4-oxo-6-quinazoline-sulfonyl chloride;
2-methyl-7-bromo-1,2,3,4-tetrahydro-4-oxo-6-quinazoline-sulfonyl chloride;
2-ethyl-7-chloro-1,2,3,4-tetrahydro-4-oxo-6-quinazoline-sulfonyl chloride;
2-ethyl-7-fluoro-1,2,3,4-tetrahydro-4-oxo-6-quinazoline-sulfonyl chloride;
2-n-propyl-7-chloro-1,2,3,4-tetrahydro-4-oxo-6-quinazoline-sulfonyl chloride;
2-i-propyl-7-bromo-1,2,3,4-tetrahydro-4-oxo-6-quinazoline-sulfonyl chloride;
2-n-butyl-7-chloro-1,2,3,4-tetrahydro-4-oxo-6-quinazoline-sulfonyl chloride;
2-sec.-butyl-7-chloro-1,2,3,4-tetrahydro-4-oxo-6-quinazoline-sulfonyl chloride.

By the treatment of these products with anhydrous or aqueous ammonia at low temperature as shown in the foregoing examples all are converted to the corresponding sulfonamides differing from that of Formula III (above) only in the 2-alkyl- and/or the 7-halo-substituents.

I claim:

1. An improved process for the chlorosulfonation of 2-alkyl-7-halo-2,3-dihydro-4(1H)-quinazolinones in which the 2-alkyl substituent contains from about one to about four carbon atoms and the 7-halo-substituent is selected from fluorine, chlorine and bromine, which process comprises: for each mol part of quinazolinone to be treated, at from about 0° to about 25° C., forming a reaction mixture comprising from about three to about eight mol parts of chlorosulfonic acid and from about 0.75 to about four mol parts of an activator selected from the group consisting of thionyl chloride and phosphorus pentachloride; then while agitating said mixture maintaining the temperature at from about 10° C. to not over 30° C., adding thereto said quinazolinone at a rate such that the exotherm does not cause the temperature to exceed said 30° C.; then continuing to maintain said temperature and agitation until the reaction substantially ceases and collecting the resultant product quinazolinesulfonyl chloride.

2. The process according to claim 1 in which said quinazolinone is 2-ethyl-7-chloro-2,3-dihydro-4(1H)-quinazolinone.

3. The process according to claim 1 in which said mixture of chlorosulfonic acid and activator is made by adding the activator to the chlorosulfonic acid at a temperature between about 10° and about 20° C.

4. The process according to claim 1 in which said quinazoline is added to the chlorosulfonation medium at a temperature between about 15° and about 25° C.

5. The process according to claim 1 in which said activator is PCl₅.

6. The process according to claim 1 in which said activator is SOCl₂.

References Cited in the file of this patent
UNITED STATES PATENTS 2,792,397     Ebel _____ May 14, 1957

FOREIGN PATENTS 1,234,708     France _____ Oct. 19, 1960
752,572     Germany _____ Jan. 4, 1954